MEMORY DEVICE INCLUDING FUNCTION PERFORMING MEANS

Filed Aug. 31, 1961 4 Sheets-Sheet 1

INVENTOR
EDWARD H. SUSSENGUTH, JR.

BY Thomas & Crickenberger
ATTORNEYS

MEMORY DEVICE INCLUDING FUNCTION PERFORMING MEANS

Filed Aug. 31, 1961 4 Sheets-Sheet 4

United States Patent Office 3,247,489

Patented Apr. 19, 1966

3,247,489
MEMORY DEVICE INCLUDING FUNCTION PERFORMING MEANS

Edward H. Sussenguth, Jr., Arlington, Mass., assignor to International Business Machines Corporation, New York, N.Y., a corporation of New York Filed Aug. 31, 1961, Ser. No. 135,268
14 Claims. (Cl. 340—172.5)

This invention relates to memory devices and more particularly to such devices wherein logical operations may be performed on data stored therein without extracting the data from the memory device.

In various types of computing systems employing memory devices, it is customary to read information from the memory, perform operations on the information and return the new information to the memory device. This involves one memory cycle to get the information, another memory cycle to return the information, and enough time to perform operations on the information. Whenever information is operated upon externally of the memory device, auxiliary equipment is usually required, and this involves a loss of time as well as an increase in the cost of construction. In order to overcome or alleviate some of the foregoing difficulties, this invention provides a memory device wherein information may be operated upon within the memory device, thereby minimizing the time involved in operating upon the information and in many instances reducing the need for auxiliary equipment external to the memory device.

According to this invention, logical operations may be performed upon data within the memory device, and the results of the logical operations may be supplied to an external device, returned to a storage location in the memory device or both supplied to an external device and returned to a storage location in the memory device.

In one arrangement of this invention, information is stored in a memory device which includes a plurality of storage registers. Circuits provided for reading or writing information in the registers of the memory device include control circuits associated therewith which selectively permit logical operations to be performed on data stored in the memory device. Such logical operations include AND, OR, EXCLUSIVE OR as well as other logical functions. A read operation, a logic determination and a write operation may take place at the same instant in memory. It is desirable to perform the logical operation in one memory cycle in the interest of saving time. If a memory device permits the energization of P read lines simultaneously and it has Q sense lines, functions of the form $$F=\bigwedge_{i=1}^{Q}\bigvee_{j=1}^{K_i} A_{ij}$$

wherein $K_1+K_2+\ldots+K_Q=P$, may be realized in one memory period. Here, the symbol $\wedge$ represents the extended AND operation and the symbol $\vee$ represents extended (INCLUSIVE) OR. To illustrate further, if the memory has two sense lines, then Equation (1) becomes $$F=\bigwedge_{i=1}^{2}\bigvee_{j=1}^{K_i} A_{ij}=\left(\bigvee_{j=1}^{K_1} A_{1j}\right)\wedge\left(\bigvee_{j=1}^{K_2} A_{2j}\right)=$$
$$(A_{11}\vee A_{12}\vee\ldots\vee A_{1k})\wedge(A_{21}\vee\ldots\vee A_{2k}$$

where $K_1+K_2=P$.

The complexity of the logical operation is determined in part by the number of sense and read lines which are available. For simplicity of illustration, the invention is shown herein with the use of two read and two sense lines per bit of information although it is understood that additional sense and read lines may be employed.

The flexible memory device of this invention may take numerous forms in practice. It is adaptable to numerous types of bistable storage devices and control circuits, and it is especially suitable for use with cryotrons and other cryogenic devices. The invention is illustrated herein with the use of cryotrons, but it is to be understood that the invention is not limited to cryotrons or cryogenic devices since other types of bistable storage devices and control circuits may be equally well employed.

The foregoing and other objects, features and advantages of the invention will be apparent from the following more particular description of preferred embodiments of the invention, as illustrated in the accompanying drawings.

Figure 1:
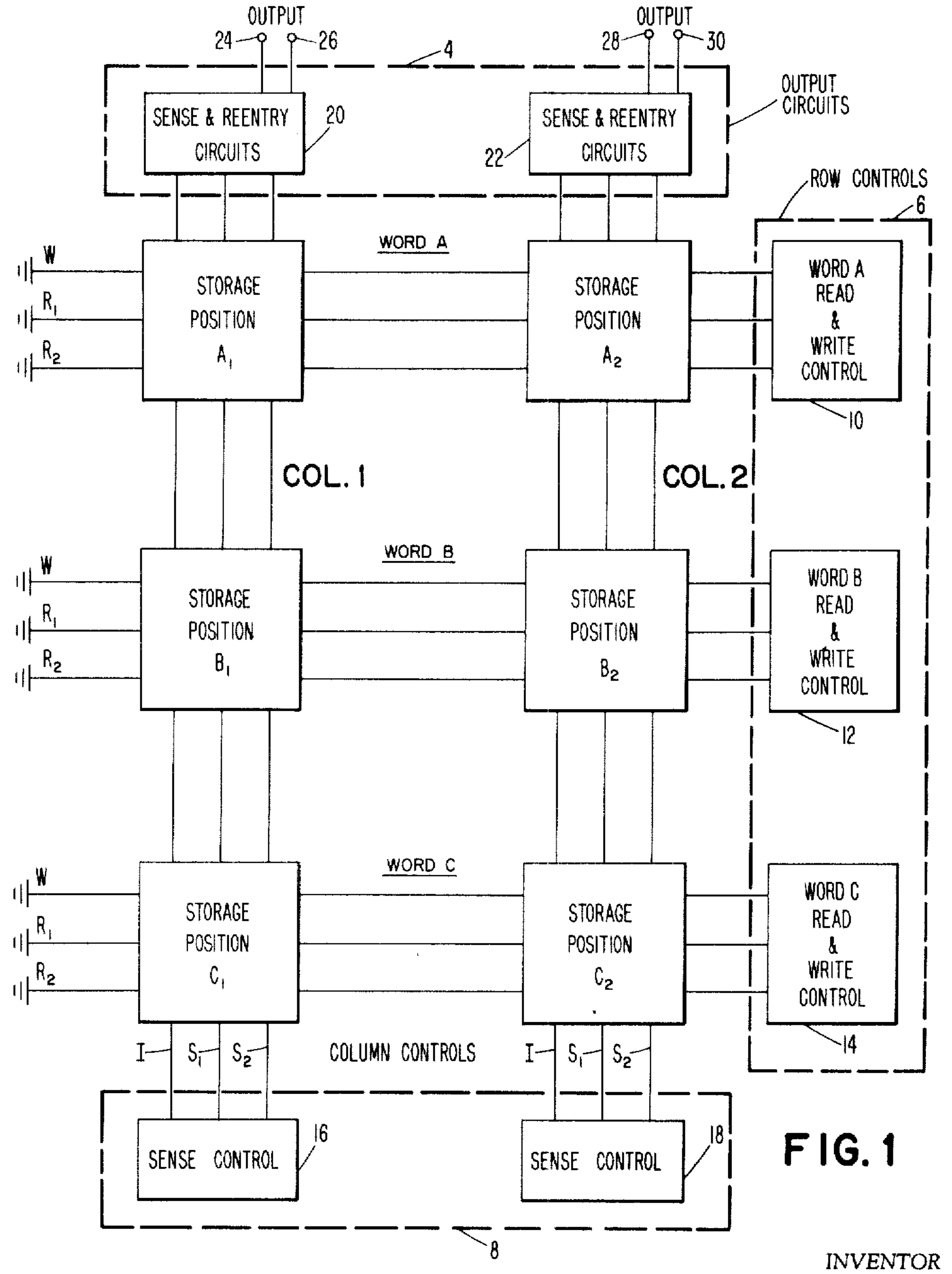
FIG. 1 illustrates a memory device in block form constructed according to the principles of this invention.
Figure 2:
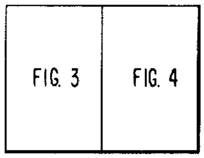
FIG. 2 illustrates how FIGS. 3 and 4 should be arranged with respect to each other.
Figure 3:
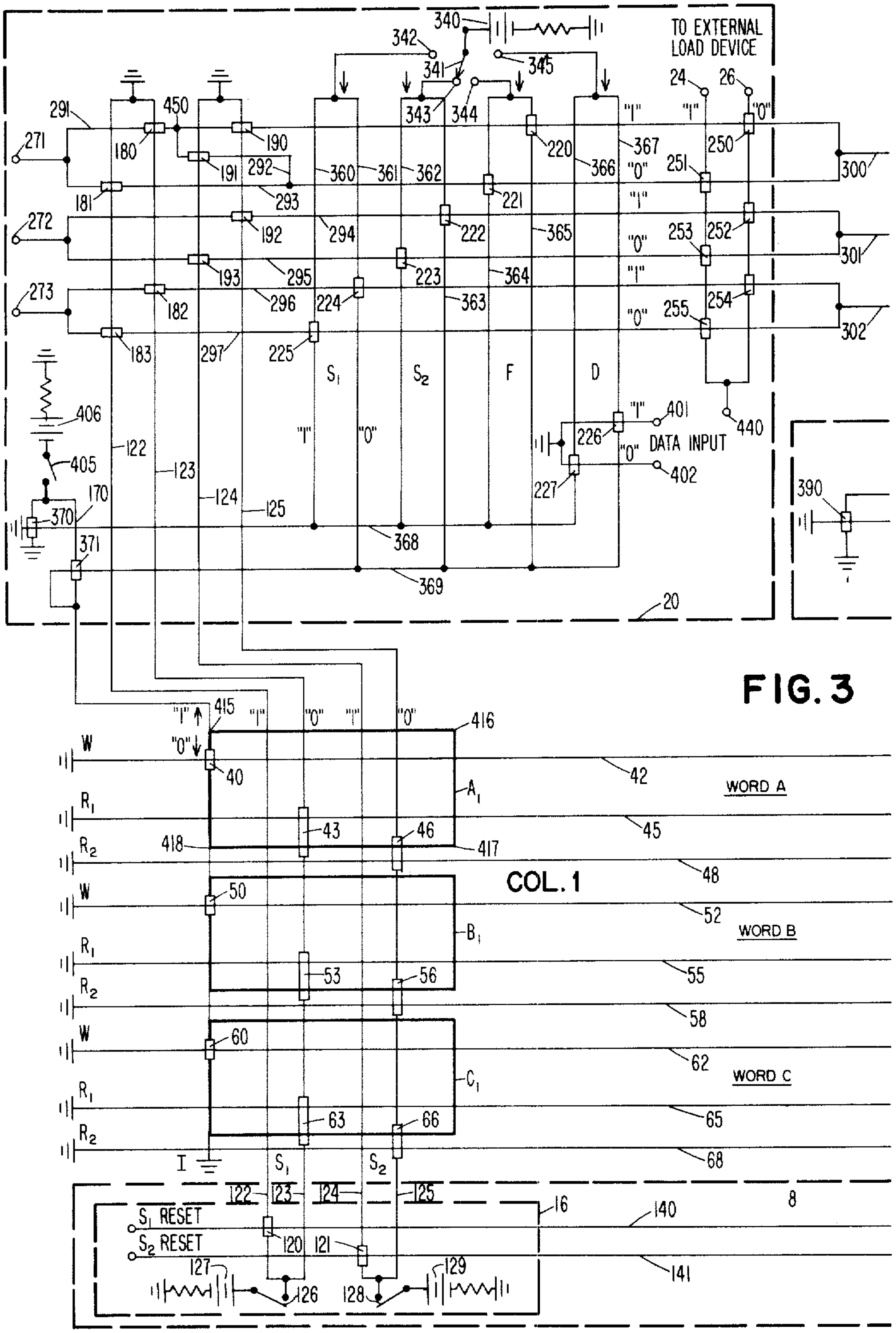
Figure 4:
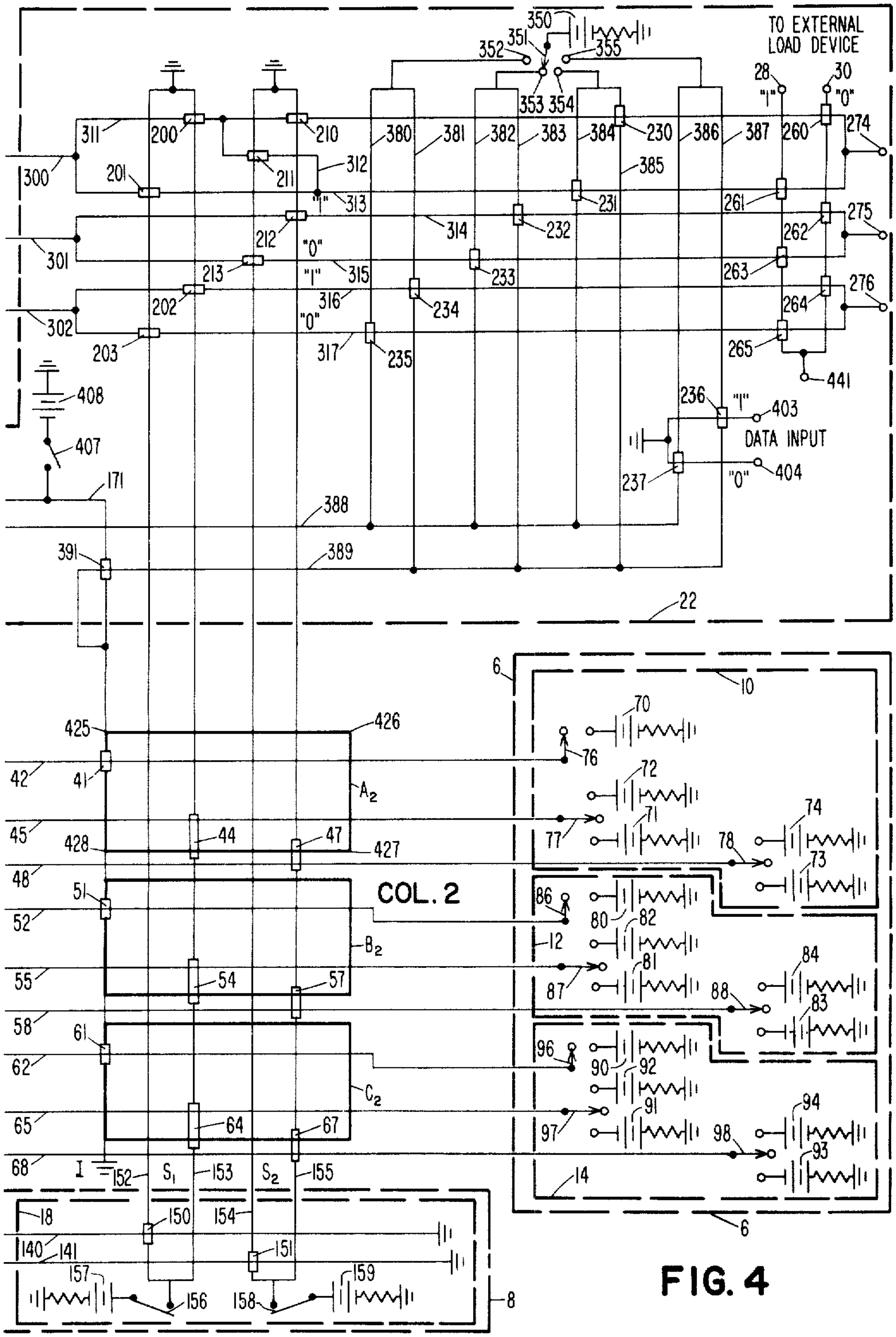
Figure 5:
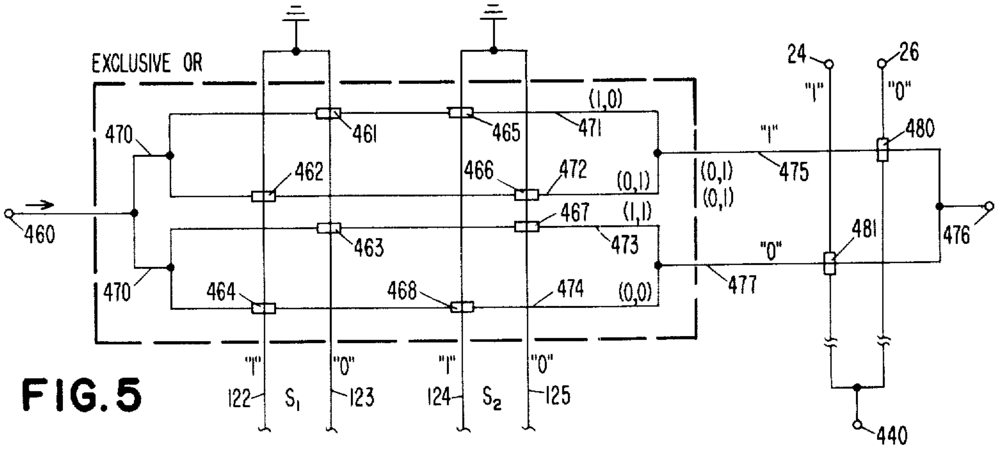
Figure 6:
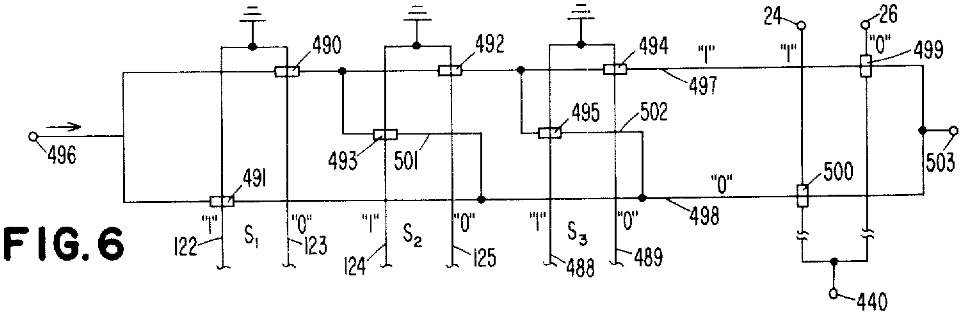

FIGS. 3 and 4, when arranged as indicated in FIG. 2, illustrate in detailed circuit schematic form one arrangement which the block diagram system of FIG. 1 may take;

FIG. 5 illustrates an EXCLUSIVE OR function in memory;

FIG. 6 illustrates an AND function in memory; and

Figure 7:
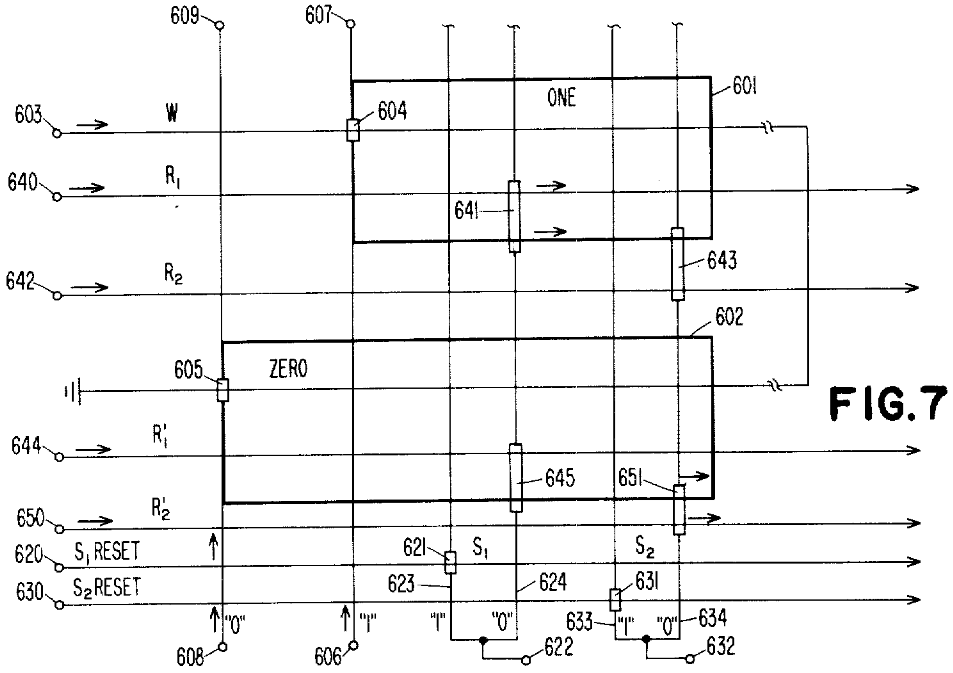

FIG. 7 illustrates a modified storage cell which may be employed in this invention.

The circuits of this invention are operated at low temperature such as by immersion in liquid helium, for example. The circuits lines or wire and the control coils of each cryotron are made of a hard superconductor such as niobium, for instance, and the gate element of cryotron is made of a soft superconductor such as tantalum, for example. When a cryotron has a single control winding, the currents established therein create a magnetic field in the control coil which exceeds the critical field of the gate, but the magnetic field does not exceed the critical field of the control coil or the connecting lines or wires. Accordingly, the gate element of the cryotron is driven resistive when current flows in the control coil of such a cryotron, and the gate element is superconductive when no current flows in the control coil or when a current of magnitude of less than critical current of the gate flows in the control coil. When a cryotron has two control windings, the current established in one of the control windings creates a magnetic field in the control coil which does not exceed the critical field of the gate, but when both control coils are supplied with currents, these currents create a magnetic field in the control coils which exceeds the critical field of the gate. If the cryotron has two control coils, the gate portion will be forced into a resistive state if and only if currents are present in both control coils and the currents are in the same direction. The gate portion will be superconducting when any of the following cases obtain: (1) no current in either control, (2) current (in either direction) in only one control, or (3) currents in both controls and these currents are in opposing directions. To state these conditions algebraically let $i_1$ be the (directed) current in one control, $i_2$ be the (directed) current in the second control, and I be the critical value of control current. Then the gate is resistive if and only if $|i_1+i_2|\geq I$. Accordingly, when one of the control coils of such a cryotron is energized with a current, the resultant magnetic field is less than the critical field, and the gate element of the cryotron remains superconductive. If both of the control coils of such a cryotron are energized with currents, the resultant magnetic fields aid one another and combine to exceed the critical magnetic field of the gate element of the cryotron, and it is driven resistive. The symbol used to represent cryotrons is conventional, and it is explained, for example, in copending applicaton Serial No. 29,899 filed May 18, 1960 now Patent No. 3,170,144 and assigned to the assignee of this invention.

Reference is made to FIG. 1 which illustrates in block form a memory system according to this invention. In the interest of simplicity, the number of words illustrated is limited to three and the number of positions in each word is limited to two. Words A, B and C are illustrated with word A having positions A and $A_2$. Word B has positions $B_1$ and $B_2$; whereas, word C has positions $C_1$ and $C_2$. Output circuit 4 provides signals representing information under the control of row controls 6 and column controls 8. Reading and writing in word A is controlled by a circuit 10 labeled "word A read and write control." Similarly, reading and writing in word B is controlled by a circuit 12 labeled "word B read and write control." In like fashion, reading and writing in word C is controlled by a circuit 14 labeled "word C read and write control." Whenever a read operation is being performed, a sense operation takes place simultaneously. For this purpose, sense control circuits 16 and 18 operate the sense lines S1 and S2, and these lines in turn operate the sense and re-entry circuits 20 and 22. The sense entry and re-entry circuits 20 and 22 supply the result of the sensing operation to associated output terminals 24, 26, 28 and 30. If the result of the sensing operation is to be stored at a given location in the memory, then signals are supplied by the sense and re-entry circuit to the write line I, and the results of the sensing operation is written at the given location in memory.

Referring next to FIGS. 3 and 4, they illustrate in circuit schematic form one arrangement according to the block diagram system illustrated in FIG. 1. FIGS. 3 and 4 should be arranged with respect to one another as indicated in FIG. 2. FIG. 3 shows the details of the sense control 16, storage positions $A_1$, $B_1$, and $C_1$ of column 1 and the sense and re-entry circuit 20 each of which are illustrated in block form in FIG. 1. FIG. 4 illustrates in detail the sense control circuit 18, the storage positions $A_2$, $B_2$, and $C_2$ and the sense and re-entry circuit 22 which are each illustrated in block form in column 2 of FIG. 1. In addition, FIG. 4 illustrates in detail the read and write control circuits 10, 12 and 14 of FIG. 1.

The storage positions $A_1$ and $A_2$ which constitute word A are illustrated in FIGS. 3 and 4 as including storage loops designated by the same reference characters $A_1$ and $A_2$. The storage positions B1 and B2 in FIG. 1 are illustrated in FIGS. 3 and 4 as including storage loops designated by the same reference characters B1 and B2. The storage positions C1 and C2 of word C in FIG. 1 are illustrated in FIGS. 3 and 4 as including storage loops designated by the reference characters C1 and C2. The storage loops A1 and A2 in FIGS. 3 and 4 have respective cryotrons 40 and 41 associated therewith, and these cryotrons are controlled by current on a write line of 42. Cryotrons 43 and 44 are associated with respective loops A1 and A2, and current on a first read line 45 controls these cryotrons. Cryotrons 46 and 47 are associated with respective storage loops A1 and A2, and these cryotrons are controlled by current on a second read line 48. The storage positions B1 and B2 in FIG. 1 are illustrated in FIGS. 3 and 4 as including storage loops designated by reference characters B1 and B2. The cryotrons 50 and 51 associated with respective storage loops B1 and B2 are controlled by current on a write line 52. Cryotrons 53 and 54 are associated with storage loops B1 and B2, and they are controlled by current on a first read line 55. The cryotrons 56 and 57 are associated with respective storage loops B1 and B2, and they are controlled by current on a second read line 58. Cryotrons 60 and 61 are associated with storage loops C1 and C2, and these cryotrons are controlled by a current on a write line 62. Cryotrons 63 and 64 are associated with respective storage loops C1 and C2, and they are controlled by current on a first read line 65. Cryotrons 66 and 67 are associated with respective storage loops C1 and C2, and they are controlled by current on a second read line 68. Naturally, it should be understood that cryotrons 43, 44, 46, 47, 53, 54, 56, 57, 63, 64, 66 and 67 are dual control cryotrons as previously explained. For example cryotron 43 is dually controlled by current on line 45 and current in loop 415–416–417–418. Binary information is represented in the storage loops by persistent currents in the clockwise or counter-clockwise direction. It is arbitrarily assumed that a persistent current in the clockwise direction represents a binary 0 and current in a counter-clockwise direction represents a binary 1. The manner in which these currents are established and interrogated is pointed out more fully hereinafter.

The row controls 6 in FIG. 4 include word read and write control circuits 10, 12 and 14. The word A read and write control circuit 10 has batteries 70 through 74. The write line 42 may be connected to the battery 70 through a switch 76. The switch 76 is connected to the battery 70 whenever a writing operation in word A takes place. Whenever a writing operation is completed, the switch 76 is disconnected and placed in the position shown. The direction of current through the line 42 is not material, but the magnitude of the current must be such that its magnetic field is equal to or exceeds the critical field of the gate of the cryotrons 40 and 41. The switch 77 in FIG. 4 is connected to the battery 71 or the battery 72 during a read operation if the read line 45 is selected. In the event the read line 45 is selected during a read operation, the switch 77 is connected to the battery 71 if information in true form is to be read from word A, and the switch 77 is connected to the battery 72 if the information in word A is to be read in complement form. During a reading operation when the read line 48 is selected, the switch 78 is connected to the battery 73 if the content word A is to be read out in true form, and the switch 78 is connected to the battery 74 if the content of word A is to be read out in complement form. It is pointed out that the read lines 45 and 48 are connected to the negative terminals of respective batteries 71 and 73 to read information in true form, and these lines are connected to the positive terminals of respective batteries 72 and 74 when information is to be read out in complement form. It is important, therefore, that current in the read lines 45 and 48 be in the proper direction since current in one direction reads information in true form and current in the opposite direction reads information in the complement form. The manner in which this is accomplished is pointed out more fully hereinafter. The word B read and write control circuit 12 in FIG. 4 includes batteries 80 through 84 and switches 86 through 88 which control read and write operations for word B in the same manner that the read and write control circuit 10 controls read and write operations for word A. The word C read and write control circuit 14 in FIG. 4 has batteries 90 through 94 and switches 96 through 98 which control the read and write operations for word C in the same manner that the read and write control circuit 10 controls the read and write operations for word A.

The column controls 8 in FIGS. 3 and 4 include individual sense control circuits 16 and 18. The sense control circuit 16 in FIG. 3 has cryotrons 120 and 121 disposed in respect to lines 122 and 124. The sense line S1 in column 1 includes the wires 122 and 123, and the sense line S2 includes the wires 124 and 125. The sense line S1 is selected by closing a switch 126 and connecting a battery 127 thereto. The sense line S2 is selected by closing a switch 128 and connecting a battery 129 thereto. Whenever the sense line S1 is selected, the switch 126 is closed and current from the battery 127 flows through either or both of the wires 122 and 123. A current is applied to a line 140 which drives the gate element of the cryotron 120 resistive and forces current from the battery 127 to flow in the line 123. This is the reset condition for the sense line S1. Current is applied to line 141 for the purpose of resetting the sense line S2. Current in the line 141 drives the gate element of the cryotron 121 resistive, and current from the battery 129 is forced to flow in the wire 125. This is the reset condition for the sense line S2. The sense control circuit 18 in FIG. 4 has cryotrons 150 and 151 disposed in lines 152 and 154. The sense line S1 for column 2 includes vertical wires 152 and 153, and the sense line S2 includes the vertical wires 154 and 155. When the sense line S1 is selected, a switch 156 is closed and current from a battery 157 flows in either or both of the wires 152 and 153. A current on the reset line 140 drives the gate element of the cryotron 150 resistive, and this forces current from the battery 157 to flow in the wire 153. When the sense line S2 is selected, the switch 158 is closed and current from the battery 159 may flow in either or both of the wires 154 and 155. A current on the reset line 141 drives the gate element of the cryotron 151 resistive, and this forces current from the battery 159 to flow in the wire 155. As soon as current from the battery 157 is diverted to the wire 153 on reset, the reset current on the line 140 is terminated. As soon as the current from the battery 159 is diverted to the line 155 during a reset operation, the reset current on the line 140 is terminated.

The sense and re-entry circuits in FIGS. 3 and 4 interrogate information read from the various cells in the associated columns. This information may be supplied through associated terminals 24, 26 and 28, 30 to an external load device, or it may be supplied to associated vertical lines 170 and 171 as re-entry signals to be stored in a given storage address. It is pointed out that information may be read to an external load device and simultaneously re-entered in a given storage location.

The sense and re-entry circuit 20 in FIG. 3 has cryotrons 180 through 183 associated with the sense wires 122 and 123 and cryotrons 190 through 193 associated with the sense wires 124 and 125 of column 1. In like fashion, the sense and re-entry circuit 22 in FIG. 4 has cryotrons 200 through 203 associated with the sense wires 152 and 153 and cryotrons 210 through 213 associated with the sense wires 154 and 155 in column 2. The foregoing cryotrons are employed to sense signals read from storage loops in associated columns 1 and 2.

The sense and re-entry circuit 20 in FIG. 3 includes cryotrons 220 through 227 which control the entry of information during a writing operation in column 1, and the sense and re-entry circuit 22 in FIG. 4 includes cryotrons 230 through 237 which control the entry of information which is written in column 2. Data received from external source is entered in column 1 under the control of cryotrons 226 and 227, and data from an external source is entered in column 2 under the control of the cryotrons 236 and 237. The cryotrons 220 through 225 in FIG. 3 control the re-entry in column 1 of information read from column 1, and in like fashion the cryotrons 230 through 235 serve the same purpose for column 2. The cryotrons 250 through 255 in FIG. 3 and the cryotrons 260 through 265 in FIG. 4 are operated to supply information to an external load device which is not shown. For sensing purposes during a read operation, currents are supplied to terminals 271 through 273 in the upper left-hand corner of FIG. 3, and these currents ultimately pass from the terminals 274 through 276. It is not important whether the current flow to the right or to the left, but for purposes of illustration, it is assumed that they flow into the terminals 271 through 273 and flow out from the terminals 274 through 276. Current entering at the terminal 271 may flow along the line 291 to a line 300; it may flow along the line 291 and through a line 292 and then along a line 293 to the line 300; it may flow along the line 293 to the line 300. Current from the line 300 which enters FIG. 4 may flow along the lines 311, 312 and 313 in various combinations as pointed out above enroute to the exit terminal 274. The current entering the terminal 272 in FIG. 3 may flow along line 294 or 295 to the line 301, and current flowing from the line 301 in FIG. 4 may flow along either of the lines 314 or 315 to the exit terminal 275. Current flowing to the terminal 273 in FIG. 3 may flow along either of the lines 296 or 297 to the line 302, and current flowing from the line 302 in FIG. 4 may flow along either of the lines 316 or 317 to the exit terminal 276. Since the switch 128 is normally closed, either cryotron 190 or 191 will be resistive and there will never be current in the current path 271–293–292–291–300. The left lines 140 and 141 must not be energized when any read line is energized for if the left and the right lines are both energized, it is possible to have both the 0 and the 1 sides of the sense lines resistive thereby not providing any superconducting path for the current.

The sense and re-entry circuit 20 in FIG. 3 has a battery 340 which is connected by a switch 341 to any one of the terminals 342 through 345 for the purpose of selecting which circuit is to be employed to supply information during a writing operation in column 1. Similarly, the sense and re-entry circuit 22 in FIG. 4 has a battery 350 which is connected through a switch 351 to any one of the contacts 352 through 355 which selects the circuit, the entry of information into column 2 during a writing operation.

When the switch 341 in FIG. 3 is placed on the contact 342, current from the battery 340 flows along either of the lines 360 or 361 to an associated one of the lines 368 or 369. Current from the line 368 controls the cryotron 370, and current on the line 369 controls the cryotron 371. Current from the battery 340 may be supplied along either of the lines 362 or 363 to associated lines 368 or 369; current from the battery may be supplied along either of the lines 364 or 365 to associated lines 368 or 369; and current may be supplied from the battery on either of the lines 366 or 367 to associated lines 368 or 369 for purpose of controlling a writing operation in column 1. In like fashion, current from the battery 350 may be supplied one of the lines 380 through 387 to an associated one of the lines 388 or 389 which in turn control cryotrons 390 and 391 for the purpose of performing a writing operation in column 2. The resistors, not numbered, shown in FIGS. 3 and 4 serve to limit or control the amplitude of current. The switches illustrated in FIGS. 3 and 4 may be transistors or other electrical switches instead of the mechanical switches shown.

As pointed out earlier, a binary 1 is represented in the storage loops by the presence of a persistent current in a counterclockwise direction and a binary 0 is represented by persistent current in the clockwise direction. In order to illustrate how these currents are established, let it be assumed that the binary word 10 is to be written in word A. That is, a binary 1 is to be written in the storage loop A1 in FIG. 3 and a binary 0 is to be written in the storage loop A2 in FIG. 4. Let it be assumed that the data input terminals 401 and 402 in FIG. 3 and data input terminals 403 and 404 in FIG. 4 are to be employed. It is necessary to position the switch 341 in FIG. 3 so that it contacts the terminals 345. In like fashion, the switch 351 in FIG. 4 is placed so that it contacts the terminal 355. Since a binary 1 is to be written in the storage loop A1 in column 1, a current is supplied to the input terminal 401 in FIG. 3, and this current drives the gate element of the cryotron 226 resistive. This causes current from the battery 340 to be diverted along a superconductive path of the line 366 through the superconductive gate of the cryotron 227 and along the line 368. Current on the line 368 drives the gate element of the cryotron 370 resistive. The switch 405 is closed, and current from the battery 406 is diverted along the vertical line 170. The current in this instance flows from the ground connection in the lower left-hand corner of FIG. 3 upwardly along the line 170 through the switch 405 to the battery 406. Since a binary 0 is to be written into storage loop A2, current is supplied to the data input terminal 404 in FIG. 4, and this drives resistive the gate element of the cryotron 237, thereby diverting current from the battery 350 to the superconductive path which includes the line 387, the superconductive gate element of the cryotron 236, and the line 389. Current along the line 389 drives the gate element of the cryotron 391 resistive. The switch 407 is closed and current from the battery 408 is diverted by the resistive gate element of the cryotron 391 through the superconductive gate element of the cryotron 390. It is pointed out that current from the battery 408 flows upwardly through the gate element of the cryotron 390 to the negative terminal of the battery 408. Current on the line 389 flows down through the line 171 to the ground connection in the lower left-hand portion of FIG. 4. At this point, the switch 76 in the row controls 6 of FIG. 4 may be closed. It is pointed out that the switch 76 may have been closed earlier in the writing operation. The closing of the switch 76 causes the current from the battery 70 to flow along the line 42 and drive resistive the gate elements of the cryotrons 40 in FIG. 3 and 41 in FIG. 4 in respective loops A1 and A2. This causes the current flowing up the vertical line 170 in FIG. 3 to be diverted around the storage loop A1 from the point 418 to the point 417 to the point 416 to the point 415 and then up along the line 170. The resistive element of the gate 41 of the storage loop A2 in FIG. 4 causes the current flowing down the line 171 to be diverted around the loop A2 from the point 425 to the point 426 to the point 427 to the point 428 and then down along the line 171. Next the switch 76 in FIG. 4 is disconnected from the battery, thereby terminating the current in the line 42. This causes the gate elements of the cryotrons 40 and 41 in respective loops A1 and A2 to become superconductive. The current flowing in the vertical lines 170 and 171 continues to be diverted in the loops A1 and A2. The switches 405 and 407 in respect to FIGS. 3 and 4 are opened, thereby terminating the flow of current in the vertical lines 170 and 171. This causes the current in the loop A1 in FIG. 3 to circulate as a persistent current around this loop from the point 418 to the point 417 to the point 416 to the point 415 and to the point 418. It causes a persistent current in the loop A2 in FIG. 4 to flow around the loop from the point 425 to the point 426 to the point 427 to the point 428 and to the point 425. It is seen therefore, that a persistent current representing a binary 1 is established in the counter-clockwise direction in the loop A1 in FIG. 3, and a persistent current representing a binary 0 is established in the clockwise direction around the loop A2 in FIG. 4. It is pointed out that the switches 341 and 405 in FIG. 3 and the switches 351 and 408 in FIG. 4 may be closed in any order including being closed simultaneously. Data signals applied to the terminals 401 through 404 must be applied during a period when the switch 76 is closed, although the data signals may be applied either before or after the closure of the switch 76. The switch 76 must be opened before currents representing information are terminated on the lines 170 and 171 as by opening the switches 405 and 407. It is seen therefore, how a writing operation is performed in word A in FIGS. 3 and 4. It is readily apparent from the foregoing description of a writing operation in word A how data signals may be inserted in words B or C by operating switch 86 or 96 during a writing operation. Moreover, data signals may be inserted in any one or any combination of the words A, B and C including all of the words A, B and C merely by operating the associated switches 76, 86 and 96 in whatever combination it is desired to store the data during a writing operation.

In order to demonstrate how a read operation is performed, let it be assumed that the word 10 previously written in word A, as explained above, is to be read and that the wires 122 and 123 in FIG. 3 and the wires 152 and 153 in FIG. 4 which constitute the S1 sense channels are to be employed. First the switches 126 and 156 in respective FIGS. 3 and 4 are closed, and the current is applied to the reset line 140. A current on the reset line 140 drives resistive the gate elements of the cryotrons 120 and 150, and this causes current from the battery 127 to be diverted along the line 123 in FIG. 3 and current from the battery 157 to be diverted along the line 153 in FIG. 4. A current flows from top to bottom of the page down the wires 123 in FIG. 3 and 153 in FIG. 4. The reset pulse on the line 140 is terminated, and current continues to flow downwardly in the wires 123 and 153. Let it be assumed that information in word A is to be read in true form therefrom. Accordingly, the switch 77 in FIG. 4 is connected to the battery 71, and current flows along the line 45 to the right in FIGS. 3 and 4. Considering first the storage loop A1 in FIG. 3, a persistent current representing a binary 1 circulates in the counterclockwise direction. Thus, current flows from the point 418 to the point 417 of the storage loop A1, and it produces a magnetic field on the gate element of the cryotron 43 in one direction. Another magnetic field in the same direction is produced on the gate element of the cryotron 43 by the current flowing to the right in the line 45. The two magnetic fields aid one another, and the resultant magnetic field on the gate element of the cryotron 43 is equal to or greater than the critical magnetic field of the gate element of the cryotron 43. This drives the gate element of the cryotron 43 resistive and current from the battery 127 is diverted from the line 123 to the line 122. The current flowing in the line 122 in FIG. 3 drives resistive the gate element of the cryotron 183 of the sense and re-entry circuit 20. Current is applied to the terminal 273 whenever the S1 channel is selected for sensing during a reading operation. The current from the terminal 273 flows along the line 296 and drives resistive the gate elements of the cryotron 254 and 224. The current on the line 296 passes through the line 302 to the sense and re-entry circuit 22 in FIG. 4. If the information read from the storage loop A1 is to be supplied to an external device, current is applied to a terminal 440 and is diverted through the superconductive gates of the cryotrons 255, 253 and 251 to the exit terminal 24. Current flowing to the terminal 24 represents a binary 1. If information read from the storage loop A1 is to be stored in the storage loop B1 or the storage loop C1, the switch 341 in the sense and re-entry circuit 20 in FIG. 3 is closed on the contact 342, and current from the battery 340 is diverted by the resistive gate of the cryotron 224 along the line 360 to the line 368 and then to ground. Current on the line 368 drives resistive the gate element of the cryotron 370 the switch 405 is closed in case writing has to take place, and current from the battery 406 is diverted to the line 170. The current flows upwardly along the line 170, and this indicates that a binary 1 is to be written. If the binary 1 is to be written in storage loop B1, the switch 86 is closed, and if the binary 1 is to be written in the storage loop C1, the switch 96 is closed. This writing operation then takes place in the selected storage loop or loops as explained above. For example, if the binary 1 is to be written in the storage loop B1, the switch 86 is closed sufficiently long to divert current into storage loop B1 by driving resistive the gate element of the cryotron 50. Then the switch 86 is opened and subsequently the switch 405 is opened; whereupon a persistent current in the counterclockwise direction is established in the storage loop B1 representing a binary 1. Thus, it is seen that the binary 1 stored in the storage loop A1 is read to an external load device and simultaneously it is stored in the storage loop B1. The information stored in word A is not destroyed in the reading operation and this information remains unaltered after the read operation. This is pointed out for in magnetic core memories a read operation destroys the stored information.

Considering next the storage loop A2 in FIG. 4, a binary 0 is represented therein by a persistent current circulating in a clockwise direction. This current flows from the point 427 to the point 428 of the storage loop A2, and this establishes a magentic field on the gate element of the cryotron 44 in one direction while the current on the line 45 establishes a magnetic field on the gate element of the cryotron 44 in an opposite direction. The resultant magnetic field produced by the two opposing magnetic fields has a magnitude which is less than the critical field of the gate element of the cryotron 44. Accordingly, the gate element of the cryotron 44 remains superconductive, and the current in the wire 153 continues to flow therealong. Current in the wire 153 drives resistive the gate element of the cryotron 202 in the sense and re-entry circuit 22 in FIG. 4, and current from the line 302 is diverted along the line 317 which drives resistive the gate element of the cryotrons 235 and 265. If the information read from column 2 is to be supplied to an external load device, the current is applied to a terminal 441, and this current flows through the superconductive path including the gate elements of the cryotrons 264, 262 and 260 to the exit terminal 30. A current flowing to the exit terminal 30 represents a binary 0. If the binary 0 read from the storage loop A2 is to be written in the storage loop B2, the switch 351 in FIG. 4 is closed on the contact 352 and switch 407 is closed. Current from the battery 350 is diverted by the resistive element of the gate 235 to the line 381. Current on the line 381 flows to the line 389, and current on the line 389 drives the gate element of the cryotron 391 resistive. Current from the battery 408 is diverted through the superconductive gate element of the cryotron 390. The current on the line 389 flows downwardly along the line 171. A current flowing downwardly on the line 171 indicates that a binary 0 is to be written. Switch 86 is closed and the resistive gate element of the cryotron 51 diverts current flowing down the line 171 around through the storage loop B2. Then the switch 86 is opened and the switch 407 is subsequently opened, thereby establishing a persistent current in the storage loop B2 in the clockwise direction representative of binary 0. Accordingly, it is seen that the binary 0 stored in the storage loop A2 is read to an external load device and simultaneously the binary 0 is stored in a storage loop B2. The foregoing read operation can be performed by selecting the sense channel S2 instead of the sense channel S1 in which event the switches 128 and 158 in respective FIGS. 3 and 4 are closed and the switches 126 and 156 in respective FIGS. 3 and 4 are opened. A reset current is applied to the line 141, thereby diverting current from the battery 129 along the line 125 and current from the battery 159 along the line 155. In this case, the switch 77 is opened to the position indicated in the drawing and the switch 78 is connected to the battery 73 to read true information. The current established on the line 48 flowing to the right along this line creates a magnetic field on the cryotrons 46 and 47 in respective storage loops A1 and A2 in one direction. The persistent current representing binary 1 in the storage loop A1 creates a magnetic field on the gate element of the cryotron 46 which aids the magnetic field established thereon by current in the line 48, and the magnetic field established on the gate element of the cryotron 47 by the persistent current representing binary 0 of the storage loop A2 opposes the magnetic field established thereon by the current in the line 48. Accordingly, the critical field of the gate element of the cryotron 46 is exceeded and it is driven resistive, whereas, the magnetic field produced on the gate element of the cryotron 47 is less than the critical field and it remains superconductive. Therefore, the current from the battery 129 in FIG. 3 is diverted along the line 124 and the current from the battery 159 in FIG. 4 is not diverted and continues to flow along the line 155. Whenever the sense channel S2 is used, current is applied to the terminal 272 in FIG. 3 and it is diverted along the line 294, thereby driving resistive the gate elements of the cryotrons 222 and 252. The current on the line 294 flows to the line 301, and it is diverted by the resistive gate element of the cryotron 212 along the lines 315, thereby driving resistive the gate elements of the cryotrons 233 and 263. The current on the line 315 exits through a terminal 275. Current from the terminal 440 in FIG. 3 is diverted by the resistive gate element of the cryotrons 252, and it flows through the superconductive path including the gate elements of the cryotrons 255 and 253 and 251 to the exit terminal 24. A current to the exit terminal 24 represents a binary 1. Current from the terminal 441 in FIG. 4 is diverted by the resistive gate element of the cryotron 263, and it flows through the superconductive path including the gate elements of the cryotrons 264, 262 and 260 to the exit terminal 30. A current to the exit terminal 30 represents a binary 0. If the information read to the external load devices through the terminals 24, 26, 28 and 30 is to be written in a given location in the memory device, the switches 341 in FIG. 3 and 351 in FIG. 4 are closed on respective contacts 343 and 353. The information may then be written in a selective location as previously explained. Accordingly, it is seen that either the S1 sense channel or the S2 sense channel may be employed to read information. After a read operation is completed, the various closed switches are opened.

In case it is desired to read word A in complement form instead of the true form the switch 77 in FIG. 4 is closed to connect the battery 72 to the read line 45 when using the S1 sense channel, or the switch 78 is closed to connect the battery 74 to the read line 48 when the sense channel S2 is used. This reverses the currents in the lines 45 and 48 during a reading operation. Let it be assumed that the sense channel S1 is used during a reading operation and that the word 10 is stored in respective storage loops A1 and A2 or word A. In this event, the switch 77 is closed to connect the battery 72 to the read line 45, and current flows in this instance to the left along the line 45. This applies a magnetic field to the gate elements of the cryotrons 43 and 44 in one direction. This magnetic field is opposed by the persistent current representing a binary 1 in the storage loop A1, and this field is aided by the persistent current representing a binary 0 in the storage loop A2. Accordingly, the total magnetic field on the gate element of the cryotron 43 in the storage loop A1 is less than the critical field, and this element remains superconductive; whereas the total magnetic field on the gate element of the cryotron 44 of the storage loop A2 is greater than the critical field of this gate, and it is driven resistive. The current from the battery 127 in column 1 continues to flow in the wire 123, and current from the battery 157 in column 2 is diverted by the resistive gate of the cryotron 44 to the vertical wire 152. Current in the vertical wire 123 in column 1 drives resistive the gate element of the cryotron 182, and current from the terminal 273 is diverted along the line 297, thereby driving resistive the gate elements of the cryotrons 225 and 255. Current from the terminal 440 is therefore diverted to the output terminal 26 which represents a binary 0. It is seen therefore, that the binary 1 stored in the storage loop A1 is read to an external load device as a binary 0, this being the complement of the binary 1 stored. The current from the line 297 flows to the line 302, and it is diverted to the line 316 because current on the vertical line 152 in column 2 drives resistive the gate element of the cryotron 203. The current on the line 316 drives resistive the gate elements of the cryotrons 234 and 264. Current from the terminal 441 is diverted by the resistive gate of the cryotron 264 to the output terminal 28 which represents a binary 1. Accordingly, it is seen that the binary 0 stored in the storage loop A2 is read as a binary 1 to an external load device. Therefore, the complement of the binary 0 stored in the storage loop A2 is read out. If the switches 341 in FIG.

3 and 351 in FIG. 4 are closed on respective terminals 343 and 353, the information in complement form which is read to the external load devices may be stored in a selected location or locations as previously explained.

In various types of known computing systems employing memory devices, it has been customary to read information from the memory, perform logical operations on the information and then return the new information to the memory device. This involved one memory cycle to get the information, another memory cycle to return the information, and enough time to perform operations on the information. Furthermore, information operated upon externally of the memory device usually required auxiliary equipment, thereby involving a loss of time as well as an increase in the cost of construction. For the purpose of overcoming some of the foregoing disadvantages, this invention provides a memory device wherein information may be operated upon within the memory device, thereby minimizing the time involved and reducing or eliminating the need for auxiliary equipment external to the memory.

In order to demonstrate how data processing may be performed within a memory device according to this invention, let it be assumed that a logical operation involving the function $F=(A \vee B)C$ is to be performed. For column 1, the function may be expressed as $$F=(A1 \vee B1)C1$$

where A1, B1 and C1 represent the data stored in the storage loops A1, B1 and C1 respectively. For column 2, the function F may be expressed as $$F=(A2 \vee B2)C2$$

where A2, B2 and C2 represent the data bits in the storage loops in A2, B2 and C2. In order to illustrate the events which occur in a logical operation which determines the foregoing function F, let it be assumed that the information stored in words A, B and C is that indicated in Table 1 below. It should be noted in the following table that F is the result and is not previously stored in the memory.

TABLE 1

| Words | Bits | |
|---|---|---|
| | Col. 1 | Col. 2 |
| A | 1 | 0 |
| B | 0 | 0 |
| C | 1 | 1 |
| F | 1 | 0 |

The S1 sense channel will be used to interrogate storage loops A1 and B1 in column 1 and storage loops A2 and B2 in column 2, and the sense channel S2 will be used to interrogate the storage loop C1 in column 1 and the storage loop C2 in column 2. Effectively, the sense channel S1 in column 1 will determine whether a binary 1 is stored in either of the storage loops A1 or B1, and the sense channel S1 in column 2 will determine whether a binary 1 is stored in either of the storage loops A2 or B2. The sense channel S2 in columns 1 and 2 will determine whether respective storage loops C1 and C2 contain a binary 1.

In order to perform a logical operation which determines the function F under the foregoing assumptions, the switches 77, 87 and 98 are closed to connect respective batteries 71, 81 and 93 to respective lines 45, 55 and 68. The currents established on these lines cause the information to be read in true form, and information in its true form is required to satisfy the equation which defines the assumed function. Prior to closing the switches 77, 87 and 98, the switches 126, 128, 156 and 158 are closed and reset currents are applied to the lines 140 and 141 for the purpose of resetting the sense channels S1 and S2 in columns 1 and 2. After this reset operation is completed, currents on the reset lines 140 and 141 are terminated and the switches 77, 87 and 98 closed. For reasons pointed out earlier, the persistent currents in the counter-clockwise direction of the storage loop A1 representative of a binary 1 and the current on the line 45 drives the gate element resistive of the cryotron 43 and this diverts current from the battery 127 to the line 122 in column 1. Since the persistent current in the storage loop B1 is in the clockwise direction representing a binary 0, it produces a magnetic field which opposes that produced by the current on the line 55 with the result that the total magnetic field on the gate of the cryotron 53 is less than the critical field. Consequently, the gate element of the cryotron 53 remains superconductive and plays no part in diverting current from the line 123. The persistent current in the counter-clockwise direction of the storage loop C1 represents a binary 1, and the magnetic field produced thereby aids the magnetic field produced by the current on the line 68. The total magnetic field produced on the gate element of the cryotron 66 is sufficient to drive it resistive, thereby diverting current from the battery 129 to the vertical line 124. Currents on the vertical lines 122 and 124 in column 1 drive resistive the gate elements of respective cryotrons 181 and 191. During a logical operation current is applied to the terminal 271, but no current is applied to the terminals 272 and 273. The current from the terminal 271 is diverted along the line 291 through the gate element of the cryotron 180 to a junction point 450. Current at the junction point 450 is prevented from flowing along the line 292 to the line 293 because the gate element of the cryotron 191 is resistive. Consequently, current at the junction point 450 flows through the superconductive gate of the cryotron 190 along the line 291, thereby driving resistive the gate elements of the cryotrons 220 and 250. Current flows from the line 291 to the line 300 and along this line to the sense and re-entry circuit 22 in FIG. 4. If the result of this logical operation is to be supplied to an external load device, current is applied to the terminal 440 in FIG. 3, and this current is diverted by the resistive gate element of the cryotron 250 to the output terminal 24. A current to the output terminal 24 indicates that the function F equals 1. This is consistent with the showing in Table 1 since A1 is a 1 and C is a 1. If the result of this function is to be stored in memory, the switch 341 in FIG. 3 is closed on the contact 344, and the binary 1 representing the function may be stored in memory as earlier explained. If an attempt is made to store a functional result in the location of an operand of the function, a logical inconsistency may develop. A very trivial example of this is "Read word A in complement form into word A." The value stored in the cell will then oscillate: 1, then 0, then 1, then 0, . . . It is pointed out that in practice, the number of storage loops in column 1 may be any number desired, and enough storage loops are used so as to have available adequate storage space for storing the results of a logical operation in a storage loop not used as an operand in that logical operation.

Considering next column 2 during a logical operation, the storage loops A2 and B2 hold persistent currents in the clockwise direction representing binary 0, and the gate elements of the cryotrons 44 and 54 remain superconductive permitting the current in the vertical line 153 to continue flowing in this line. The persistent current in the counter-clockwise direction in the loop C2 represents a binary 1, and the magnetic field of this current pulse the magnetic field of the current on the line 68 drives the gate element of the cryotron 67 resistive, thereby diverting current from the battery 159 along the vertical line 154. Current on the vertical lines 153 and 154 drive the gate elements of respectivel cryotrons 200 and 211 resistive. Consequently, current from the line 300 is diverted through the superconductive gate element of the cryotron 201 along the line 313. Since the gate element of the cryotron 211 is resistive, current cannot flow from the line 313 along the line 312, and the current continues along the line 313 to the exit terminal 274. The current on the line 313 drives resistive the gate elements of the cryotrons 23 and 261. If the result of the function is to be supplied to an external load device, current is applied to the terminal 441 and this current is diverted to the exit terminal 30 which represents a binary 0. This indicates that the function F for column 2 is binary 0. This is consistent with the showing in Table 1 wherein the bits A1 and B1 are 0's and the bit C2 is a binary 1, thereby yielding binary 0 for the function of column 2. After the logical operation for determining the function for F has been completed, the switches 77, 87 and 98 in the row controls 6 in FIG. 4 are opened, and the switches 126, 128, 156 and 158 in the column controls 8 of FIGS. 3 and 4 are opened. Accordingly, it is seen how the function $F=(A \vee B)\overline{C}$ is determined for columns 1 and 2. In order to realize any Boolean function by a logical operation entirely within memory, logical complementation is required. If it is desired to determine the function $F=(A \vee B)\overline{C}$, this requires that the quantity A be read in true form, that the quantity B be read in true form and the quantity C be read in complement form. This function can be realized by a logical operation performed with the memory device in FIGS. 3 and 4 because, as pointed out earlier, words A, B and C may be read in true or in complement form. The function $F=(A \vee B)\overline{C}$ may be performed by a logical operation similar to that described above. In this case, the switch 77 of the row of controls 6 in FIG. 4 is closed to connect the battery 77 to the read line 45; the switch 87 is closed to connect the battery 81 to the read line 55 whereby, the words A and B are read in true form. The switch 98, however, is closed to connect the battery 94 to the read line 68 whereby the word C is read in complement form. The function $F=(A \vee B)\overline{C}$ is thus obtained by a logical operation similar to that described above.

Numerous other logical functions in addition to those described above may be obtained by operating the memory device in FIGS. 3 and 4. The manner in which a given logical function is obtained depends upon which read lines are employed, whether the read lines are selected to read in true or complement form, the selection of the sense channels S1 and S2 and the selection of the output sensing circuit determined by whether current is applied to the terminal 271, 272 or 273. In some cases, the same logical operation may be performed using different combinations of the switches and circuits described in the preceding sentence. To illustrate further, the function $F=A \vee B \vee C$ may be determined by alternative selections. For example, if the switches 77, 87 and 97 are connected to respective batteries 71, 81 and 91, the sense channel S1 may be employed provided a current is applied to the terminal 273 in column 1 and switch 126 is closed. Alternatively, the sense channel S2 may be employed if the current is applied to the terminal 272 in column 1 and switch 128 is closed. Thus it is seen how the same functiion may be determined by using alternative selections.

As a further illustration, let it be assumed that the function $F=AB$ may be performed by closing the switches 77 and 88 to connect respective batteries 71 and 83 to respective read lines 45 and 58. Both of the sense channels S1 and S2 are selected, and current is applied to the terminal 271 of the sense and re-entry circuit 20 in FIG. 3. The output terminal 24 of the sense and re-entry circuit 20 will receive a current if both A1 and B1 storage loops contain 1's. Otherwise, the output terminal 26 will receive a current if either of the storage loop A1 or B1 contains a 0. It is pointed out that a current to the output terminal 26 represents a binary 0 and a current to the output terminal 24 represents a binary 1 from the sense and re-entry circuit 20 in column 1. An alternative way to determine the function $F=AB$ is to use both the S1 and S2 sense channels as before, but switches 78 and 87 may be connected to respective batteries 73 and 81 to energize respective read lines 48 and 55. Accordingly, it is seen that the same function is determined by alternative selections.

Other sensing circuits beside those illustrated in the sense and re-entry circuits 20 and 22 in FIGS. 3 and 4 may be employed to perform logical operations. For example, an EXCLUSIVE OR circuit such as shown in FIG. 5 or an extended AND circuit such as shown in FIG. 6 may be employed. The circuit in FIGS. 5 and 6 may be substituted for some of those illustrated in FIGS. 3 and 4, or the circuits in FIGS. 5 and 6 may be added to those shown in FIGS. 3 and 4.

The EXCLUSIVE OR circuit illustrated in FIG. 5 is supplied with a current through a terminal 460 when it is employed for a sensing operation. Both of the sense channels S1 and S2 are selected when this circuit is used. The sense channel S1 controls cryotrons 416 through 464, and the sense channel S2 controls the cryotrons 465 through 468. Current from the terminal 460 is conveyed on a line 470 to lines 471 through 474. If either of the lines 471 or 472 carries current, this current is conveyed along a line 475 to an exit terminal 476. If either of the lines 473 or 474 carries current, this current is conveyed along a line 477 to the exit terminal 476. Current on the line 475 derives resistive the gate element of cryotron 480, and current on the line 477 drives resistive the gate element of a cryotron 481.

In operation the EXCLUSIVE OR circuit in FIG. 5 provides a current to the 0 output terminal 26 whenever the input quantities are alike, and the current is supplied to the 1 output terminal 24 whenever the input quantities are unlike. In order to demonstrate the operation of the EXCLUSIVE OR circuit in FIG. 5, let it be assumed that a current is applied to the input terminal 460 and that the information supplied on the sense channels S1 and S2 is binary 1 in each instance. Accordingly, a current flows from the vertical line 122 which drives resistive the gate elements of the cryotrons 462 and 464, and a current flows on the line 124 which drives resistive the gate elements of the cryotrons 465 and 468. Therefore, the current from the terminal 460 flows along the line 470, along the line 473, along the line 477 and exits at the output terminal 476. The gate element of the cryotron 481 is driven resistive and current from the terminal 440 is supplied to the 0 output terminal 26. Since both inputs are binary 1's, the output should be binary 0. It is readily seen that if the sense channel S1 conveys a 0 and the sense channel S2 conveys 0, current from the terminal 460 flows along the line 470, the line 474, the line 477 and exits at the terminal 476. The gate element of the cryotron 481 is driven resistive and current from the terminal 440 is supplied to the 0 output terminal 26. In both of the preceding cases, the information on the sense channel S1 was exactly like the information on the channel S2, and the output signal in each case was a binary 0. There remains two cases where the information on the channel S1 is unlike the information on the channel S2. Considering first the case where the information on the sense channel S1 is a binary 1 and the information on the sense channel S2 is a binary 0, it is readily seen that current applied to the terminal 460 passes along the wire 470, the wire 471, the wire 475 and exits at the terminal 476. This causes the gate element of the cryotron 480 to be driven resistive and current from the terminal 440 is supplied to the one output terminal 24. If the sense channel S1 conveys a binary 0 and the sense channel S2 conveys a binary 1, it is readily seen that a current applied to the terminal 460 flows along the line 470, the line 472, the line 475 and exits at the terminal 476. Current applied to the terminal 440 is diverted to the one output terminal 24 because the gate element of the cryotron 480 is driven resistive. Accordingly, it is seen how the EX- CLUSIVE OR function is determined by a logical operation in memory. There is not shown in FIG. 5 a re-entry circuit for supplying information to a given storage location such as shown in FIGS. 3 and 4, but in view of the explanation given in FIGS. 3 and 4 it is readily seen how a re-entry circuit may be provided if desired.

Referring next to FIG. 6, an AND circuit is shown having three inputs. Two of the inputs are defined as sense channels S1 and S2, and a third input is defined as a sense channel S3. The sense channel S3 has lines 488 and 489. The lines forming the sense channels S1 and S2 are labeled with the same numbers used in FIGS. 3 and 4. This third sense channel S3 may be provided in the memory device illustrated in FIGS. 3 and 4 if desired. Since an extra sense channel is provided, such functions as $F=ABC$ may be performed. The channel S1 controls cryotrons 490 and 491; the sense channel S2 controls cryotrons 492 and 493; and the sense channel S3 controls cryotrons 494 and 495. Current from a terminal 496 may pass along either of the lines 497 or 498 and operate the respective cryotrons 499 and 500. Cross-over lines 501 and 502 are disposed between the lines 497 and 498. Current may flow back and forth between the lines 497 and 498 on the lines 501 and 502. Current along either of the lines 497 or 498 exits at a terminal 503.

In order to demonstrate the operation of the AND circuit in FIG. 6, let it be assumed that the input sense channels S1, S2 and S3 each convey a binary 1. Consequently, the gate elements of cryotrons 491, 493 and 495 are driven resistive. This diverts current from the terminal 496 along the line 497 to the exit terminal 503, and current from the terminal 440 is diverted to the one output terminal 24. In case any one of the input sense lines S1, S2 or S3 conveys a binary 0, current ultimately flows along the line 498 to the exit terminal 503, and current from the terminal 440 is diverted to the 0 output terminal 26. Accordingly, it is seen how a three-way AND circuit performs its function in a logical operation in memory. The number of inputs may be increased or decreased as desired.

Numerous types of memory cells may be employed in a memory arrangement according to this invention. FIG. 7 illustrates another type of memory cell which may be suitably employed in the present invention. The memory cell in FIG. 7 includes two storage loops 601 and 602. A persistent current in the counter-clockwise direction is established in the storage loop 601 to represent a binary 1 in which no persistent current is established in the storage loop 602. A persistent current is established in the counter-clockwise direction in the loop 602 to represent a binary 0 in which case no persistent current is established in the storage loop 601. In order to write a binary 1 in the memory cell of FIG. 7, a current is applied to a terminal 603 in the direction indicated by the arrowhead, and this drives resistive the gate elements of cryotrons 604 and 605. Next a current is applied to a terminal 606 in the direction indicated by the arrow, and this current is diverted by the resistive gate of the cryotron 604 to the right around the loop 601 and out from the exit terminal 607. The current applied to the terminal 603 is terminated, and subsequently the current applied to the terminal 606 is terminated, thereby establishing a persistent current in the storage loop 601 in the counter-clockwise direction. It is noted that no current is stored in the storage loop 602. Any current previously stored in loop 602 is destroyed by the resistive gate of cryotron 605. In order to write a binary 0, a current is applied to the terminal 603 in the direction indicated by the arrow, and the current is applied to a terminal 608 in the direction indicated by the arrow. The current applied to the terminal 608 is diverted by the resistive gate of the cryotron 605 to the right around the loop 602, and this current exists at the terminal 609. Next, current to the terminal 603 is terminated, and subsequently, the current applied to the terminal 608 is terminated. Whereupon, a persistent current is established in the counter-clockwise direction in the storage loop 602 and this current represents a binary 0. It is pointed out that no persistent current is stored in the storage loop 601. Any current previously stored in loop 601 is destroyed by the resistive gate of cryotron 604.

In order to read information from the storage cell in FIG. 7 in true form, the storage cell 601 is interrogated. If it is desired to read information in complement form from the storage cell in FIG. 7, then the storage loop 602 is interrogated. Read lines R1 and R2 are energized with currents when reading information in true form, and read lines R1′ and R2′ are energized with currents when information is read in complement form. The sense channels S1 and S2 are associated with respective read lines R1 and R2 in the storage loop 601, and the sense channels S1 and S2 are associated with respective read lines R1′ and R2′ in the storage loop 602. The sense channel S1 is reset by a current applied to a terminal 620 which drives resistive the gate element of a cryotron 621, thereby diverting current applied to terminal 622 from a line 623 to a line 624. This is the reset condition of the sense channel S1, and the sense channel S1 is always reset at the beginning of a read operation when the read line R1 is selected. The sense channel S2 is reset by a current applied to a terminal 630 which drives resistive the gate element of the cryotron 631 and diverts current applied to a terminal 632 from a line 633 to a line 634. The sense channel S2 is in the reset condition when a current flows on the line 634. The sense channel S2 is always reset at the beginning of a read operation whenever the read line R2 or R2′ is selected.

In order to illustrate a read operation, let it be assumed that information in true form is to be read using the sense channel S1. In this case, a current is applied to a terminal 64 after the sense channel S1 is reset. If the storage loop 601 has no persistent current, the current on the read line R1 is not sufficient to drive resistive the gate element of a cyrotron 641, and current from the terminal 622 flows on the vertical line 624, representing a binary 0. If the storage loop 601 has a persistent current circulating in the counter-clockwise direction, this represents a binary 1 and the current on the read line R1 and the current in the storage loop 601 produce a total magnetic field on the gate element of the cryotron 641 to drive it resistive. This diverts current from the terminal 622 from the line 624 to the line 623, thereby representing a binary 1. In case information in true form is to be read using the sense channel S2, a current is applied to a terminal 642 to the read line R2 after the sense channel S2 is reset. If there is no persistent current in the storage loop 601, the gate element of a cryotron 643 remains resistive, and current flows on the vertical line 634 representing a binary 0. If the storage loop 601 has a persistent current in a counter-clockwise direction, this represents a binary 1, and the current in the storage loop 601 and the current in the read line R2 produce a total magnetic field on the gate element of the cryotron 643 which is sufficient to drive it resistive. This diverts current from terminal 632 from the line 634 to the line 633, thereby representing a binary 1. If information in complement form is to be read from the storage cell in FIG. 7 using the sense channel S1, a current is applied to a terminal 644 to the read line R1′. If the persistent current in the counterclockwise direction is stored in the storage loop 602, this current and the current on the R1′ read line drive the gate element of the cryotron 645 resistive. This causes current applied to the terminal 622 to be diverted from the line 624 to the line 623, a current on this line representing a binary 1. It is seen therefore that a binary 0 represented by a current in the loop 602 causes a binary 1 to be represented on the output of the S1 sense channel. In case the storage loop 602 has no persistent current stored therein, this indicates that the storage cell in FIG. 7 contains a binary 1. The current on the read line R1′ is not sufficient to drive the gate element of the cryotron 645 resistive, and current continues to flow on the vertical line 624 representing a binary 0. The binary 0 represented on the output of the sense channel S1 is the complement of the binary 1 represented by the persistent current in the storage loop 601. If information is to be read in complement form using the sense channel S2, a current is applied to a terminal 650 to the read line R2′ after the sense channel S2 is reset. If the storage loop 602 has a persistent current stored therein representing a binary 0, the gate element of the cryotron of the cryotron 651 is driven resistive because the current in the storage loop 602 and the current on the read line R2′ produce a total magnetic field equal to or greater than the critical field of the gate element of the cryotron 651. This causes current applied to the terminal 632 to be diverted to the line 633, current on this line representing a binary 1. In case the storage cell in FIG. 7 contains a binary 1, there is no persistent current in the storage loop 602 and the current on the read line R2′ is not sufficient to drive the gate element of the cryotron 651 resistive. Accordingly, current from the terminal 632 continues to flow on the line 634 representing a binary 0. This represents the complement of the binary 1 stored in the storage loop 601. It is readily seen that the type of storage cell illustrated in FIG. 7 may be incorporated in a memory system such as illustrated in FIGS. 3 and 4.

As described herein, the information contained in a particular column cannot influence information in another column. This prohibits such unary logical operations as "shifting" and binary operations as "arithmetic addition." Specifically, if we wished to add the contents of word A to word B, the following Boolean operation must be performed on each bit position:

$$S_i = A_i\bar{B}_i\bar{C}_{i-1} \vee \bar{A}_i B_i \bar{C}_{i-1} \vee \bar{A}_i \bar{B}_i C_{i-1} \vee A_i B_i C_{i-1}$$

where $C_{i-1}$ is the carry from column i–1, and $S_i$ is the result sum bit.

Hence, we desire some built-in feature to allow one bit position to influence logical operations in another position. This is readily accomplished by offsetting one or more memory words one or more bit positions to the left. For example, if a memory word is offset one bit position to the right and if the bit positions are numbered from the right to the left in the order . . . 3, 2, 1, when the $i$ bit position of a normal register is read out of the $i+1$ bit position of the register which is offset to the right is read out. Likewise, if a register is offset to the left when the $i$ bit position of the normal register is read out $i-1$ bit position of the register which is offset to the left is read out. Hence, for example, in order to perform addition as set out in the Boolean equations above the C word (i.e. the carry) would be stored in a register wherein the bit positions are offset to the left so that when the $i$ position of the A and B registers is read out the $i-1$ position of the C register is read out.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory device having a plurality of storage registers composed of storage loops arranged in columns and rows, writing means coupled to each storage register for storing signals representative of information, reading means coupled to each register for interrogating the stored signals and supplying output signals representative of the information stored, control means coupled to the reading means and writing means, said control means operating the reading means and writing means to cause the reading means to read selectively two or more storage registers simultaneously and to cause the writing means to store signals representative of information in one or more selected registers simultaneously, said control means operating the writing means and the reading means simultaneously, function determining means for performing a logical operation in memory coupled to receive signals from the reading means, the function determining means responding to the signals from the reading means to ascertain a function and supply output signals representative of the function to an external load device and to the writing means, the writing means responding to the signals from the function determining means to store signals in a selected storage register or registers as determined by the control means, said writing means having in each column a first line connected to a plurality of storage loops and persistent currents in one direction are established in the loops to represent a binary zero and persistent currents in the opposite direction are established to represent a binary one, a second line connected in parallel with said first line, said first and second lines being connected to a source of current, a first cryotron having its gate element connected in series between the first line and said source of current, a second cryotron having its gate element connected in series between the second line and said source of current, a first input control line connected through the control winding of said first cryotron to said first line, a second input control line connected to the control winding of said second cryotron, means to supply a current to said first input control line in one direction whenever a binary zero is to be represented by a persistent current in said storage loops and to supply a current in the same direction to the second input control line whenever a binary one is to be represented by a persistent current in said storage loops, whereby current from the current source is supplied in one direction to said storage loops whenever persistent currents representative of binary one are to be stored in said storage loops and current from said first input control line is supplied in the opposite direction to said storage loops whenever persistent currents are to be established therein representative of binary zero.

2. A memory device having a plurality of storage loops arranged in columns and rows with the storage loops in a row representing registers used for storing signals representative of information, writing means including a write line for each row, each write line being coupled to each storage loop in the associated row, reading means including at least two read lines for each row, each read line being coupled to each storage loop in the associated row, sensing means associated with the reading means, the sense means including at least two sense channels for each column, each sense channel being coupled to each storage loop in the associated column, means for selectively controlling the write means and the read means to perform read and write operations simultaneously, a function determining means coupled to the sense channels and operated under control thereof, the function determining means having output means coupled to an external load device and to the writing means whereby the results of a function which is determined may be both stored in memory and read to an external device.

3. The apparatus of claim 2 wherein the function determining means is an AND circuit with at least two inputs.

4. The apparatus of claim 2 wherein the function determining means is an OR circuit with at least two inputs.

5. The apparatus of claim 2 wherein the function determining means is an EXCLUSIVE OR circuit with two inputs.

6. The apparatus of claim 2 wherein the function determining means is an AND circuit with at least two inputs, an OR circuit with at least two inputs and an EXCLUSIVE OR circuit with two inputs.

7. A memory device including a plurality of storage registers composed of storage loops arranged in columns and rows, write means coupled to the storage loops of each register for storing signals representative of infomation, said writing means having in each column a first line connecting the column storage loops in series and a second line connected in parallel with said first line, a source of current connected to said first and second lines, a first cryotron having its gate element connected in series between the first line and said source of current, a second cryotron having its gate element connected in series between the second line and said source of current, a first input control line connected through the control winding of said first cryotron to said first line, a second input control line connected to the control winding of said second cryotron, means to supply a current to said first input control line in one direction whenever a binary zero is to be represented by a persistent current in said storage loops and to supply a current to the second input control line whenever a binary one is to be represented by a persistent current in said storage loops, whereby current from the current source is supplied in one direction to said storage loops whenever persistent currents representative of binary one are to be stored in said storage loops and current from said first input control line is supplied in the opposite direction to said storage loops whenever persistent currents are to be established therein representative of binary zero.

8. A memory device including a plurality of storage registers composed of storage loops arranged in columns and rows, write means coupled to the storage loops of each register for storing signals representative of information, said writing means having in each column a first line connecting the column storage loops in series and a second line connected in parallel with first line, a source of current, a first cryotron having its gate element connected in series with the first line and said source of current, a second cryotron having its gate element connected in series with the second line and said source of current, a first input control line conected through the control winding of said first cryotron to said first line, a second input control line connected to the control winding of said second cryotron, means to supply a current to said first input control line in a given direction whenever a first binary quantity is to be represented by a persistent current in said storage loops and to supply a current to the second input control line in either direction whenever a second binary quantity is to be represented by a persistent current in said storage loops, whereby current from the current source is supplied in one direction to said storage loops whenever persistent currents representative of said second binary quantity are to be stored in said storage loops and current from said first input control line is supplied in the opposite direction to said storage loops whenever persistent currents are to be established therein representative of said first binary quantity.

9. A memory device having a plurality of storage registers composed of storage loops arranged in columns and rows, first means coupled to each storage register for storing signals therein representative of information, second means coupled to each storage register for selectively interrogating in true and complement form signals stored therein, third means coupled to each storage register for selectively interrogating in true and complement form signals stored therein, fourth means coupled to said second and third means for performing logical operations which determine functions involving information stored in at least two storage registers in the memory device, control means coupled to said second and third means for selectively operating and interrogating at least two storage registers simultaneously whereby information thus obtained may be utilized by said fourth means, said first means having in each column a source of current and a first line and a second line disposed in parallel relationship acros the source of current, each column further including first and second cryotrons, and first and second control lines, each cryotron including a gate element and a control winding, the gate element of the second cryotron being connected in series with said source of current and said second line, the second control line being connected in series with the control winding of said second cryotron, said first line being connected in series with said storage loops of each column, the gate elements of the first cryotron, and said current source, said first control line being connected to one side of the control winding of said first cryotron, the other side of the control winding of said first cryotron being connected to that side of the gate element of the first cryotron opposite to said source of current, means connected to said first and second control lines for selectively supplying a current to either of said control lines, whereby current from the current source is supplied in one direction to said storage loops whenever persistent currents representative of a first binary quantity are to be stored in said storage loops and current from said first input control line is supplied in the opposite direction to said storage loops whenever persistent currents are to be established therein representative of a second binary quantity.

10. A memory device including a plurality of storage registers composed of storage loops arranged in columns and rows, write means coupled to the storage loops of each register for storing signals representative of information, said writing means having in each column a first line connecting the column storage loops in series and a second line connected in parallel with said first line, a source of current, a first cryotron having its gate element connected in series with the first line and said source of current, a second cryotron having its gate element connected in series with the second line and said source of current, a first input control line connected serially with the control winding of said first cryotron, said first line and storage loops in series, a second input control line connected to the control winding of said second cryotron, means to supply a current to said first input control line in a given direction whenever a first binary quantity is to be represented by a persistent current in said storage loops and to supply a current to the second input control line whenever a second binary quantity is to be represented by a persistent current in said storage loops, said source of current being poled to supply a current to said first line in a direction opposite to the current supplied from said input control line, whereby current from the current source is supplied in one direction to said storage loops whenever persistent currents representative of said second binary quantity are to be stored in said storage loops and current from said first input control line is supplied in the opposite direction to said storage loops whenever persistent currents are to be established therein representative of said first binary quantity.

11. A memory device having a plurality of storage registers composed of storage loops arranged in columns and rows, writing means coupled to each storage register for storing signals representative of information, said writing means having in each column a source of current and a first line and a second line disposed in parallel relationship across the source of current, each column further including first and second cryotrons, and first and second control lines, each cryotron including a gate element and a control winding, the gate element of the second cryotron being connected in series with said source of current and said second line, the second control line being connected in series with the control winding of said second cryotron, said first line being connected in series with said storage loops of each column, the gate element of the first cryotron, and said current source, said first control line being connected to one side of the control winding of said first cryotron, the other side of the control winding of said first cryotron being connected to that side of the gate element of the first cryotron opposite to said source of current, means connected to said first and second control lines for selectively supplying a current to either of said control lines, whereby current from the current source is supplied in one direction to said storage loops whenever persistent currents representative of a first binary quantity are to be stored in said storage loops and current from said first input control line is supplied in the opposite direction to said storage loops whenever persistent currents are to be established therein representative of a second binary quantity.

12. A memory device having a plurality of storage registers, first means coupled to each storage register for storing signals therein representing information, second means coupled to each storage register for selectively interrogating in true and complement form signals stored therein, third means coupled to each storage register for selectively interrogating in true and complement form signals stored therein, fourth means coupled to said second and third means for performing logical operations which determine functions involving information stored in at least two storage registers in the memory device, and control means coupled to said second and third means for selectively operating and interrogating at least two storage registers simultaneously whereby information thus obtained may be utilized by said fourth means.

13. A memory device having a plurality of storage registers, first means coupled to each storage register for storing signals therein representing information, reading means coupled to each storage register for interrogating signals stored therein, said reading means including first circuit means for each storage register which interrogates stored signals in true form of complement form, said reading means further including second circuit means for each storage register which interrogates stored signals in true form or complement form, second means coupled to said first circuit means and said second circuit means for performing logical operations on information stored in at least two storage registers in the memory device, and control means coupled to said reading means for interrogating at least two storage registers simultaneously.

14. A memory device having a plurality of storage registers, first means coupled to each storage register for storing signals therein representing information, reading means coupled to each storage register for interrogating signals stored therein, said reading means including first circuit means for each storage register which interrogates stored signals in true or complement form, said reading means further including second circuit means for each storage register which interrogates stored signals in true or complement form, second means coupled to said first circuit means and said second circuit means for performing logical operations on information stored in at least two storage registers in the memory device, control means coupled to said reading means for interrogating at least two storage registers simultaneously, said storage registers being composed of storage loops arranged in columns and rows, said first means having in each column a first line connecting the column storage loops in series and a second line connected in parallel with said first line, a source of current, a first cryotron having its gate element connected in series with the first line and said source of current, a second cryotron having its gate element connected in series with the second line and said source of current, a first input control line connected through the control winding of said first cryotron to said first line for supplying a current to the column storage loops which are connected in series, a second input control line conected to the control winding of said second cryotron, means to supply a current through said first input control line in a given direction whenever a first binary quanity is to be represented by a persistent current in said storage loops and to supply a current to the second input control line in either direction whenever a second binary quantity is to be represented by a persistent current in said storage loops, whereby current from the current source is supplied in one direction to said storage loops whenever persistent currents representative of said second binary quantity are to be stored in said storage loops and current from said first input control line is supplied in the opposite direction to said storage loops whenever persistent currents are to be established therein representative of said first binary quantity.

References Cited by the Examiner

UNITED STATES PATENTS

| | | | |
|---|---|---|---|
| 3,021,439 | 2/1962 | Anderson | 235—61 |
| 3,031,586 | 4/1962 | Anderson | 340—173.1 |

OTHER REFERENCES

Non-Destructive Read-Out of Superconducting Storage Elements (Glicksman and Steele).

RCA Technical Notes No. 221, January 1959.

Cryogenic Devices in Logical Circuitry and Storage (Bremer), February 1958 issue of the magazine Electrical Manufacturing.

ROBERT C. BAILEY, *Primary Examiner.*

MALCOLM A. MORRISON, *Examiner.*